United States Patent
Lan et al.

(10) Patent No.: US 12,375,018 B2
(45) Date of Patent: Jul. 29, 2025

(54) METHOD FOR CONTROLLING OPERATION OF PERMANENT-MAGNET SYNCHRONOUS MOTOR THROUGH SENSORLESS VECTOR CONTROL

(71) Applicant: Zhongshan Broad-Ocean Motor Co., Ltd., Zhongshan (CN)

(72) Inventors: Jinghao Lan, Zhongshan (CN); Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 155 days.

(21) Appl. No.: 18/382,039

(22) Filed: Oct. 19, 2023

(65) Prior Publication Data

US 2024/0056009 A1    Feb. 15, 2024

Related U.S. Application Data

(63) Continuation-in-part of application No. PCT/CN2022/079833, filed on Mar. 9, 2022.

(30) Foreign Application Priority Data

Jul. 20, 2021 (CN) .......................... 202110818589.6

(51) Int. Cl.
*H02P 21/18* (2016.01)
*H02P 3/18* (2006.01)
(Continued)

(52) U.S. Cl.
CPC ............... *H02P 21/24* (2016.02); *H02P 3/18* (2013.01); *H02P 25/022* (2013.01); *H02P 27/08* (2013.01)

(58) Field of Classification Search
CPC ........ H02P 21/18; H02P 25/022; H02P 21/36; H02P 21/34; H02P 3/18; H02P 27/08; H02P 21/24
(Continued)

(56) References Cited

U.S. PATENT DOCUMENTS 10,784,805 B1 *   9/2020 Bojoi ..................... H02P 21/22
2016/0233812 A1 *   8/2016 Lee ........................ H02P 21/22
(Continued)

FOREIGN PATENT DOCUMENTS

CN    106911271 A    6/2017
CN    107104620 A    8/2017
(Continued)

*Primary Examiner* — Gabriel Agared
(74) *Attorney, Agent, or Firm* — MATTHIAS SCHOLL P.C.; Matthias Scholl

(57) ABSTRACT

A method for controlling operation of a permanent-magnet synchronous motor includes: during operation of the permanent-magnet synchronous motor, receiving, by the permanent-magnet synchronous motor, a shutdown signal from an external device; uninterruptedly outputting, by a microcontroller unit (MCU), a deceleration pulse to an inverter, instead of directly blocking a PWM pulse to the inverter, and constantly monitoring a control signal sent by the external device; during a deceleration process, when the MCU receives a new startup signal and a real-time speed Vi of the permanent-magnet synchronous motor is greater than or equal to a reference speed Vref, controlling the permanent-magnet synchronous motor to rotate at a parameter approaching to a target torque T or a target speed V corresponding to the new startup signal; and blocking, by the MCU, the PWM pulse when the real-time speed Vi of the permanent-magnet synchronous motor is lower than the reference speed Vref.

5 Claims, 13 Drawing Sheets

(51) Int. Cl.
*H02P 21/24* (2016.01)
*H02P 21/34* (2016.01)
*H02P 21/36* (2016.01)
*H02P 25/022* (2016.01)
*H02P 27/08* (2006.01)

(58) Field of Classification Search
USPC .................................................. 318/400.02
See application file for complete search history.

(56) References Cited

U.S. PATENT DOCUMENTS

| 2019/0356255 | A1* | 11/2019 | Sankala | H02P 21/18 |
| 2020/0162008 | A1  | 5/2020  | Jung et al. | |
| 2020/0244203 | A1* | 7/2020  | Hara | H02P 3/04 |
| 2022/0376640 | A1* | 11/2022 | Tseng | H02P 21/18 |
| 2023/0387834 | A1* | 11/2023 | Kang | H02P 6/24 |

FOREIGN PATENT DOCUMENTS

| CN | 113037146 A | 6/2021 |
| KR | 20130031728 A | 3/2013 |
| KR | 101652061 B1 | 8/2016 |

\* cited by examiner

METHOD FOR CONTROLLING OPERATION OF PERMANENT-MAGNET SYNCHRONOUS MOTOR THROUGH SENSORLESS VECTOR CONTROL

CROSS-REFERENCE TO RELATED APPLICATIONS

This application is a continuation-in-part of International Patent Application No. PCT/CN2022/079833 with an international filing date of Mar. 9, 2022, designating the United States, now pending, and further claims foreign priority benefits to Chinese Patent Application No. 202110818589.6 filed Jul. 20, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for controlling operation of a permanent-magnet synchronous motor through sensorless vector control.

Permanent-magnet synchronous motors with Hall sensors are able to constantly sense the position and speed of the rotor through Hall sensors, thus ensuring stable and reliable control of the entire process. However, the use of Hall sensors increases the size and cost of the motor, and the wiring between Hall sensors leads to interference, thereby reducing the performance of the motor. Moreover, the accurate installation of Hall sensors increases the complexity of motor production processes. Currently, many manufacturers are gradually promoting permanent-magnet synchronous motors without Hall sensors to overcome the disadvantages of using Hall sensors, which expands the application range of permanent-magnet synchronous motors. However, since the rotor position of the motor is estimated by complex algorithms, the control algorithm requires high reliability.

To improve the starting torque, especially for large inertia loads, a commonly used method is to start with pre-positioning. However, this method allows the permanent-magnet synchronous motor to keep rotating for a long period when the large inertia load receives a stop signal (which is intended to stop the permanent-magnet synchronous motor) from outside. If a running signal is restored during this period, the permanent-magnet synchronous motor will restart while still rotating, which can result in overcurrent, jerking, noise, and other abnormal situations. In extreme cases, it may even cause damage to components. Currently, there are two methods to solve the problems: 1) waiting for the load to stop completely before starting the permanent-magnet synchronous motor; however, due to the large inertia of the load, this method takes a long time, resulting in poor user experience; 2) after turning off the pulse and receiving the running signal from outside, the permanent-magnet synchronous motor still needs to continue rotating due to the large inertia of the load. And if the permanent-magnet synchronous motor is started according to the pre-positioning method when the rotation speed is high, it can produce impact voltage that can damage the switching device. Moreover, if the permanent-magnet synchronous motor is directly started from pre-positioning while rotating at a high speed, it can cause large current impact, as well as shaking, jerking, noise, and other issues. This requires additional hardware redundancy design, but the issues of shaking, jerking, noise, and other issues cannot be entirely solved, and there is still a possibility of permanent-magnet synchronous motor startup failure.

SUMMARY

To solve the aforesaid problems, an objective of the disclosure is to provide a method for controlling operation of a permanent-magnet synchronous motor through sensorless vector control.

The method for controlling operation of a permanent-magnet synchronous motor through sensorless vector control comprises: during operation of the permanent-magnet synchronous motor, receiving, by the permanent-magnet synchronous motor, a shutdown signal from an external device; uninterruptedly outputting, by a microcontroller unit (MCU), a deceleration pulse to an inverter, instead of directly blocking a PWM pulse to the inverter, and constantly monitoring a control signal sent by the external device; during a deceleration process, when the MCU receives a new startup signal and a real-time speed $V_i$ of the permanent-magnet synchronous motor is greater than or equal to a reference speed $V_{ref}$, controlling the permanent-magnet synchronous motor to rotate at a parameter approaching to a target torque T or a target speed V corresponding to the new startup signal from the real-time speed $V_i$; and blocking, by the MCU, the PWM pulse when the real-time speed $V_i$ of the permanent-magnet synchronous motor is lower than the reference speed $V_{ref}$.

In a class of this embodiment, when the MCU blocks the PWM pulse, the permanent-magnet synchronous motor continues rotating due to inertia, and the control signal sent by the external device is constantly monitored; if, at this stage, the MCU receives another new startup signal, all the lower bridge switch transistors are activated, causing the permanent-magnet synchronous motor to enter a dynamic braking mode for a duration t1; the MCU gives commands to input currents to the phase windings sequentially to lock the rotor position for a duration t2; and the permanent-magnet synchronous motor then reenters into a sensorless startup state according to the new startup signal.

In a class of this embodiment, the permanent-magnet synchronous motor is a three-phase permanent-magnet synchronous motor with a three-phase winding comprising three sets of coils U, V, W; when the MCU blocks the PWM pulse and the MCU receives the new startup signal, three lower bridge switch transistors Q4, Q5, and Q6 are activated, causing the motor to enter the dynamic braking mode for the duration t1; and the MCU gives commands to input currents to the three sets of coils U, V, and W sequentially to lock the rotor position for the duration t2.

In a class of this embodiment, when the motor receives a shutdown signal from outside, the MCU controls the motor to decelerate; when the shutdown signal exceeds or equals a set time duration t3, the MCU blocks the PWM pulses.

In a class of this embodiment, the reference speed $V_{ref}$ is in the range of 200 to 400 rpm.

In a class of this embodiment, the permanent-magnet synchronous motor rotates at the parameter approaching to the target speed V corresponding to the new startup signal from the real-time speed $V_i$ with a step size $V_0$ increasingly or decreasingly.

In a class of this embodiment, the step size $V_0$ is determined based on the rotational inertia and the difference between the real-time speed $V_i$ and the target speed V corresponding to the acquired tap position signal.

The following advantages are associated with the disclosure:

The permanent-magnet synchronous motor receives a shutdown signal from an external device during operation; instead of directly blocking a PWM pulse to the inverter, MCU continues to generate a deceleration pulse to an inverter and constantly monitors a control signal sent by the external device; during the deceleration process, when the real-time speed Vi of the motor is greater than or equal to the reference speed Vref, and the MCU receives a new startup signal, the permanent-magnet synchronous motor is controlled to rotate at a parameter approaching to a target torque T or a target speed V corresponding to the new startup signal from a real-time speed Vi; when the real-time speed Vi of the permanent-magnet synchronous motor is lower than the reference speed Vref, the MCU blocks the PWM pulses. In applications with high-inertia loads, the method allows the permanent-magnet synchronous motor to respond promptly and smoothly during tap position signal recovery, frequent start-stop cycles, and tap position switching, thereby preventing issues such as shaking, jerking, and noise.

DETAILED DESCRIPTION

To further illustrate the disclosure, embodiments detailing a method for controlling operation of a permanent-magnet synchronous motor through sensorless vector control are described below. It should be noted that the following embodiments are intended to describe and not to limit the disclosure.

Example 1

Figure 1:
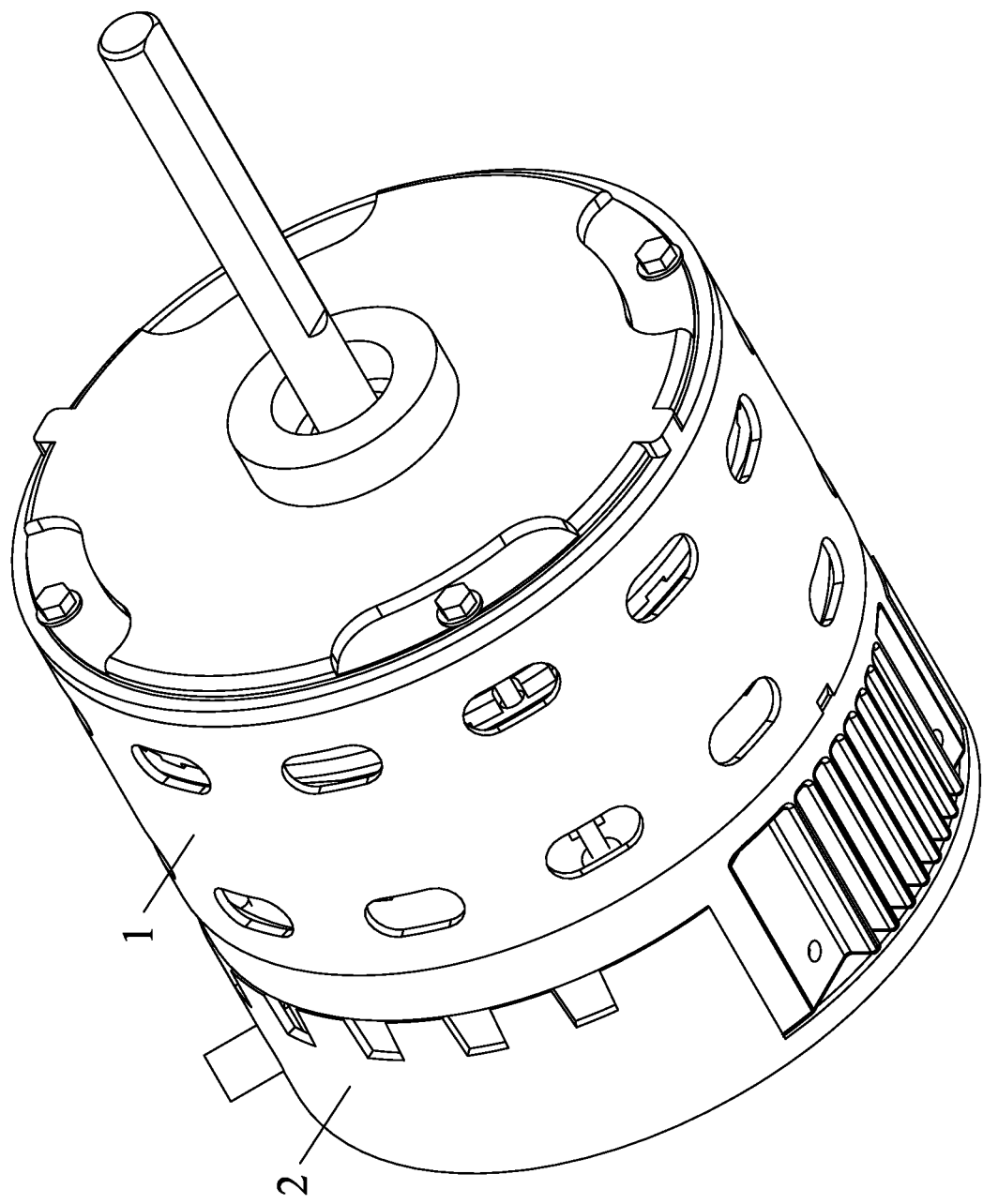
FIG. 1 is a perspective view of a permanent-magnet synchronous motor according to Example 1 of the disclosure.
Figure 2:
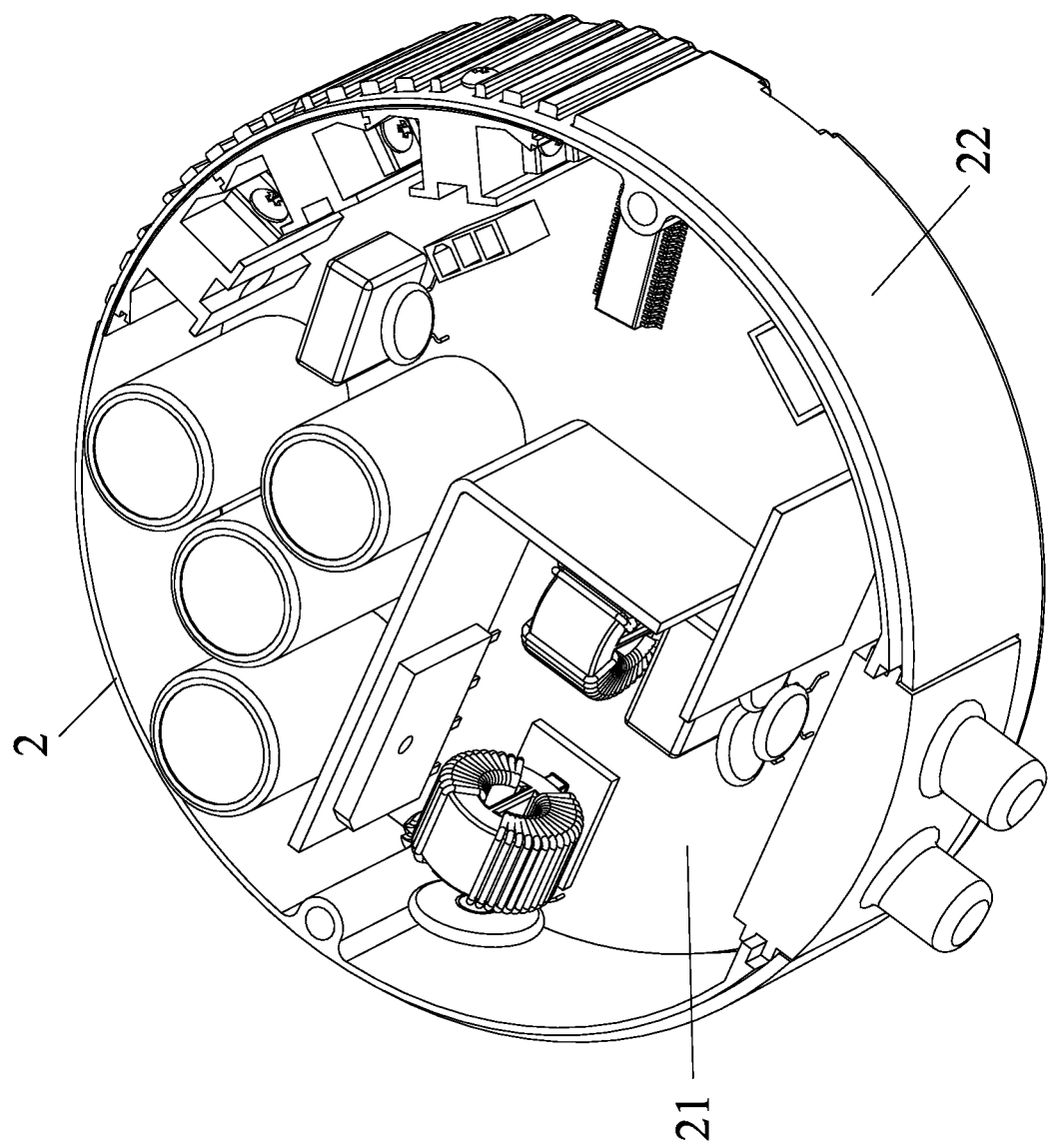
FIG. 2 is a perspective view of a motor controller for a permanent-magnet synchronous motor according to Example 1 of the disclosure.
Figure 3:
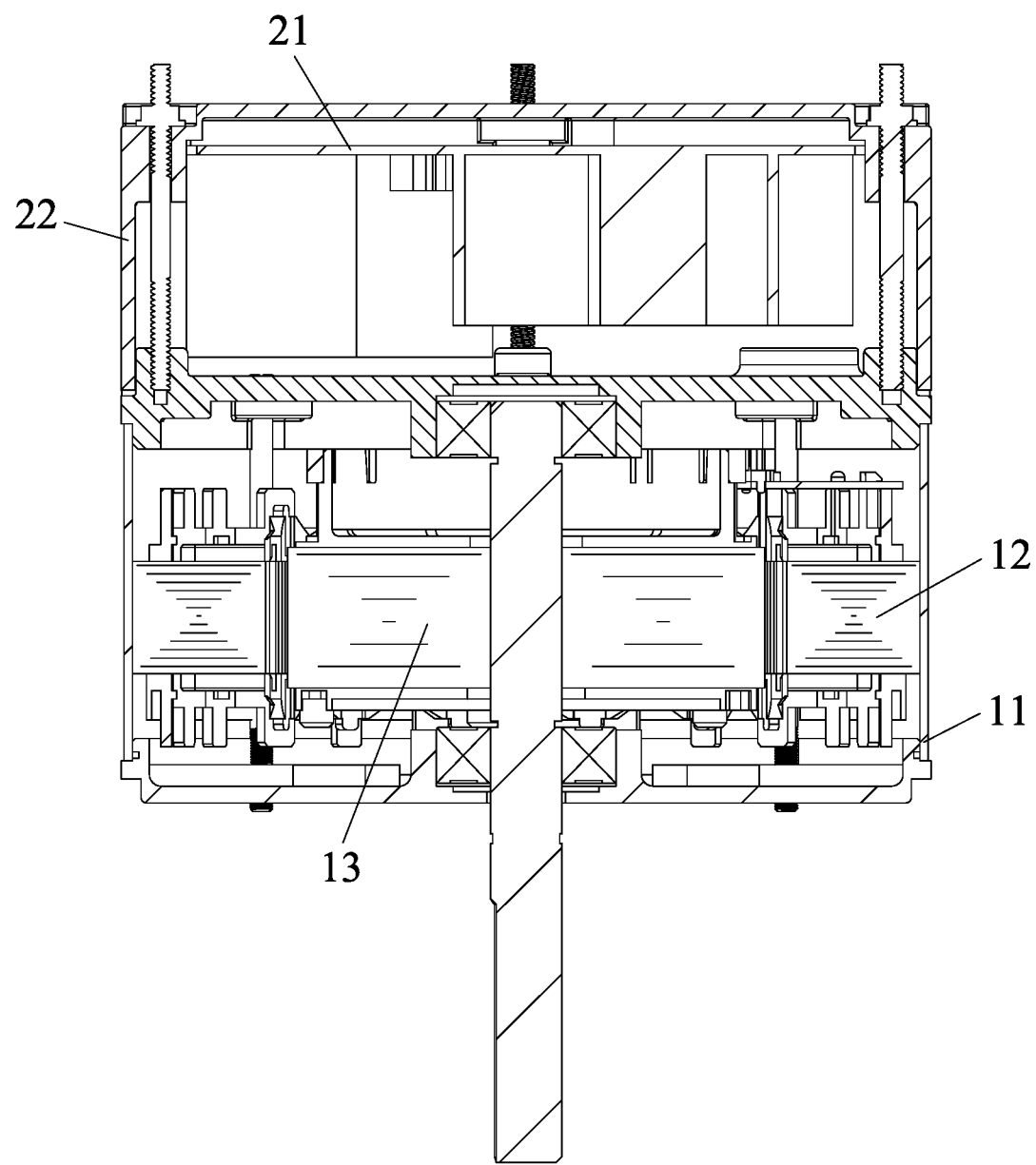
FIG. 3 is a cross-sectional view of a permanent-magnet synchronous motor according to Example 1 of the disclosure.

As shown in FIGS. 1-3, a three-phase permanent-magnet synchronous motor comprises a motor controller 2 and a motor body 1. The motor body 1 comprises a stator assembly 12, a rotor assembly 13, and a casing assembly 11. The stator assembly 13 is disposed on the casing assembly 11, and the rotor assembly 13 is disposed on the inside or outside of the stator assembly 12. The motor controller 2 comprises a control box 22 and a control circuit board 21 disposed inside the control box 22. The control circuit board 21 comprises a power circuit, a microcontroller unit (MCU), a bus voltage detection circuit, and an inverter. The power circuit is configured to supply electrical power to each part of the circuit. The bus voltage detection circuit is configured to input the DC bus voltage Uabc to the MCU. The MCU is configured to control the inverter. The inverter is configured to manage the switching state of the phase winding of the stator assembly 12. The stator assembly 12 comprises a stator core and a three-phase winding. The three-phase winding comprises three sets of coils U, V, W.

The three-phase permanent-magnet synchronous motor further comprises a phase current detection circuit configured to input two phase currents ia and ib of three sets of coils to the MCU. Based on the relationship between three phase currents ia, ib, and ic, the phase current ic can be calculated, and the MCU can calculate the q-axis current iq. These calculations are already described in textbooks and will not be repeated here. A full-wave rectifier circuit comprises diodes D7, D8, D9, and D10, which are configured to convert input AC voltage into DC bus voltage Vbus. The DC bus voltage Vbus is output at one end of the capacitor C1 and is relative to the input AC voltage. The MCU is configured to output the PWM signal to the inverter. The inverter comprises six electronic switch transistors Q1, Q2, Q3, Q4, Q5, and Q6 each comprising a control terminal. The six control terminals are regulated by six PWM pulse signals (P1, P2, P3, P4, P5, and P6) output from the MCU, respectively. The electronic switch transistors Q1, Q2, Q3, Q4, Q5, and Q6 are divided into two sets: a set of three upper bridge switch transistors Q1, Q2, Q3, and a set of three lower bridge switch transistors Q4, Q5, Q6.

Figure 4:
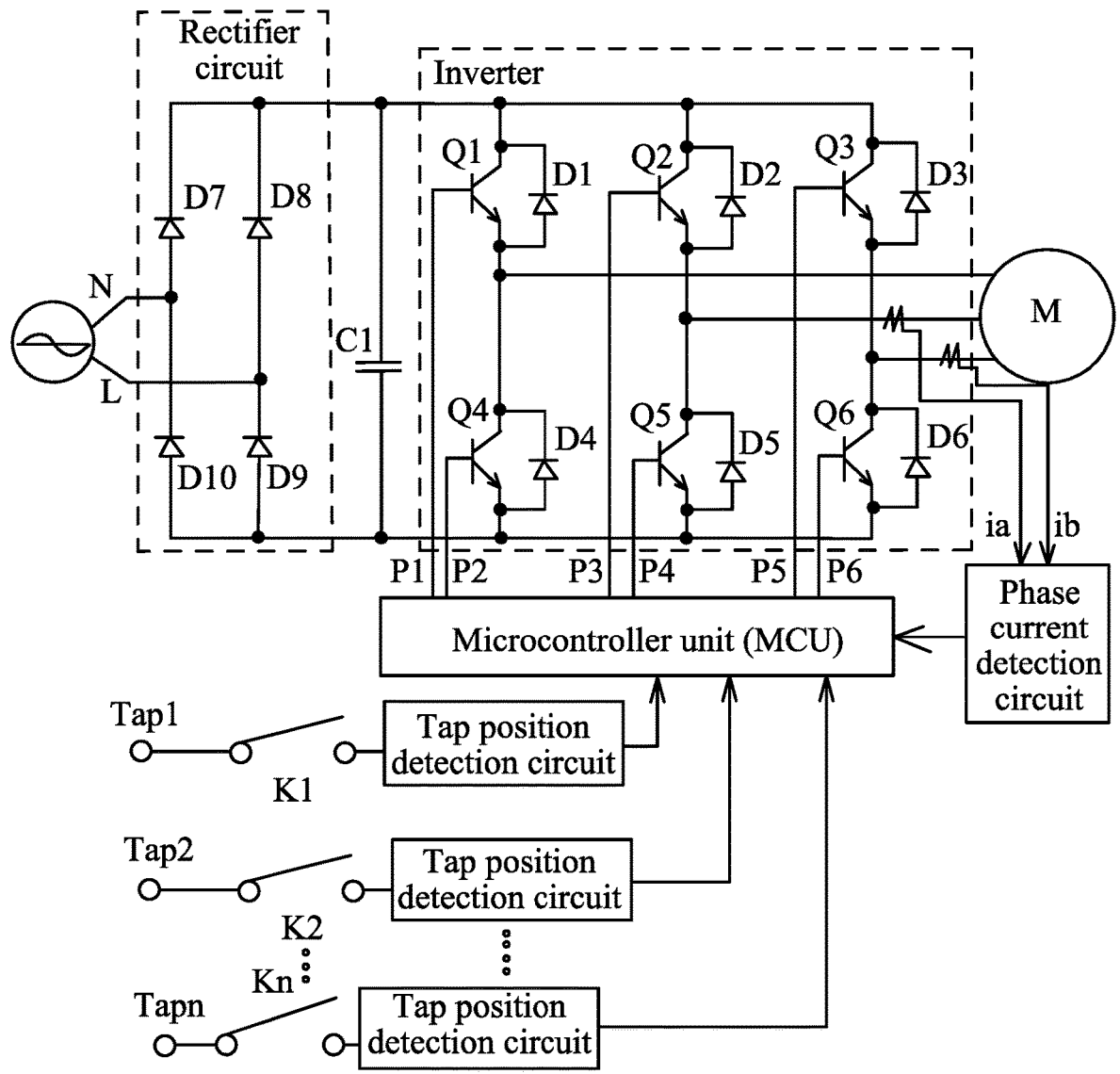
FIG. 4 is a schematic diagram illustrating a control principle of a motor controller according to Example 1 of the disclosure.

As shown in FIG. 4, the MCU comprises a plurality of tap position input signals Tap1, Tap2 . . . Tapn, where n is an integer. Each tap position input signal is connected to a tap position detection circuit via a switch. The MCU utilizes several tap position detection circuits to detect the corresponding tap position input signals. The tap position input signals Tap1, Tap2 . . . Tapn correspond to switches K1, K2 . . . Kn, respectively. For example, when the switch K1 is closed, the corresponding tap position input signal Tap1 is detected by the connected tap position detection circuit and sent to the MCU, the MCU then controls the motor to operate at a preset speed. For instance, the tap position input signal Tap1 corresponds to a motor speed of 700 rpm, the tap position input signal Tap2 corresponds to 800 rpm, the tap position input signal Tap3 corresponds to 900 rpm, and the tap position input signal Tapn corresponds to 1400 rpm. The MCU controls the motor to operate at a specific speed corresponding to the acquired tap position input signal. When none of the tap position input signals are received by the MCU (i.e., when all switches are open), the MCU blocks the PWM signal output, resulting in the deactivation of the electronic switch transistors Q1, Q2, Q3, Q4, Q5, and Q6. This state is commonly known as "pulse-blocking shutdown" in the industry.

When all switches K1, K2 . . . Kn are open, all the tap position input signals Tap1, Tap2 . . . Tapn are disconnected from the MCU. In this situation, the tap position input signals can be referred to as shutdown signals sent by the external device. However, when one of the switches K1, K2 . . . Kn is closed, corresponding one of the tap position input signals Tap1, Tap2 . . . Tapn is inputted to the MCU.

Figure 5:
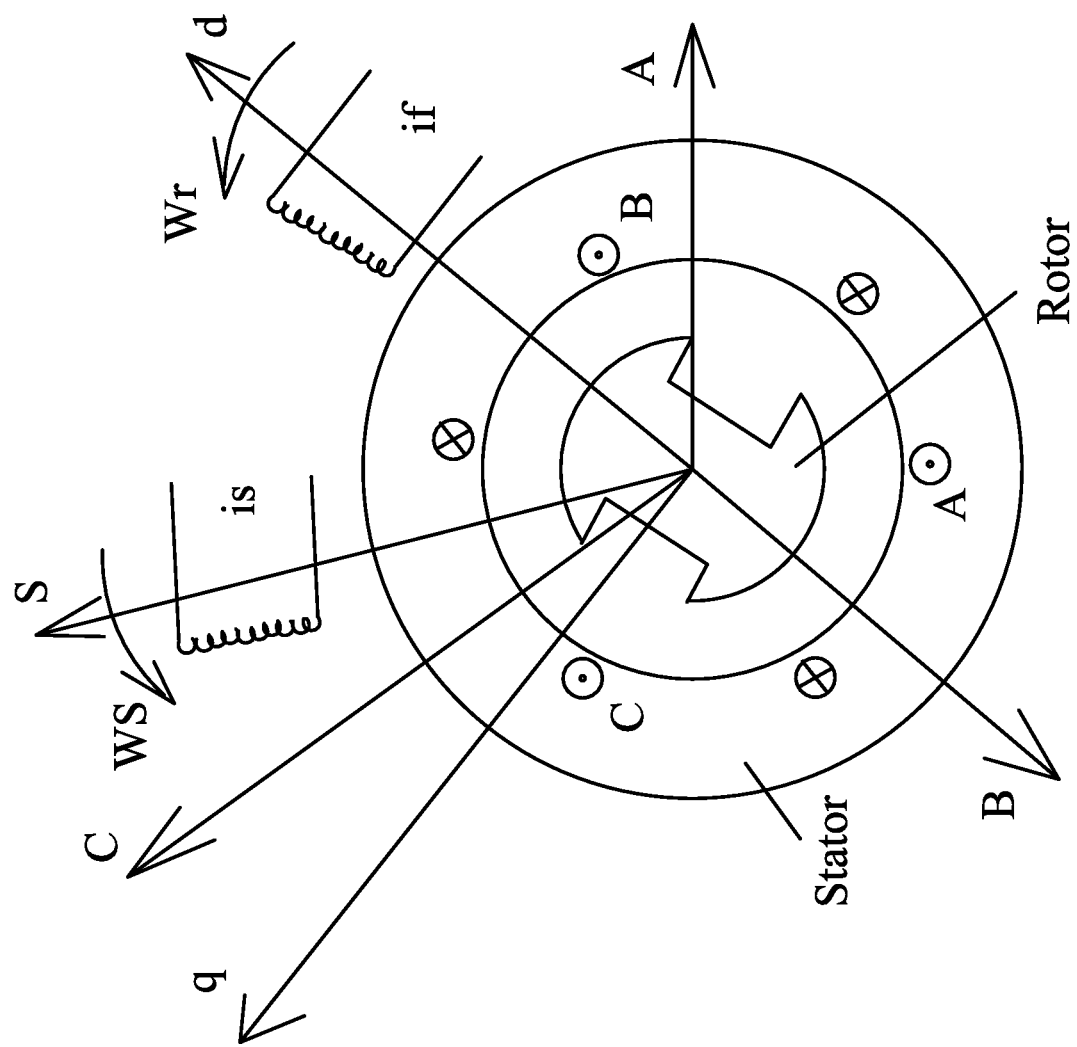
FIG. 5 is a schematic diagram illustrating a principle of sensorless vector control of a permanent-magnet synchronous motor according to Example 1 of the disclosure.
Figure 6:
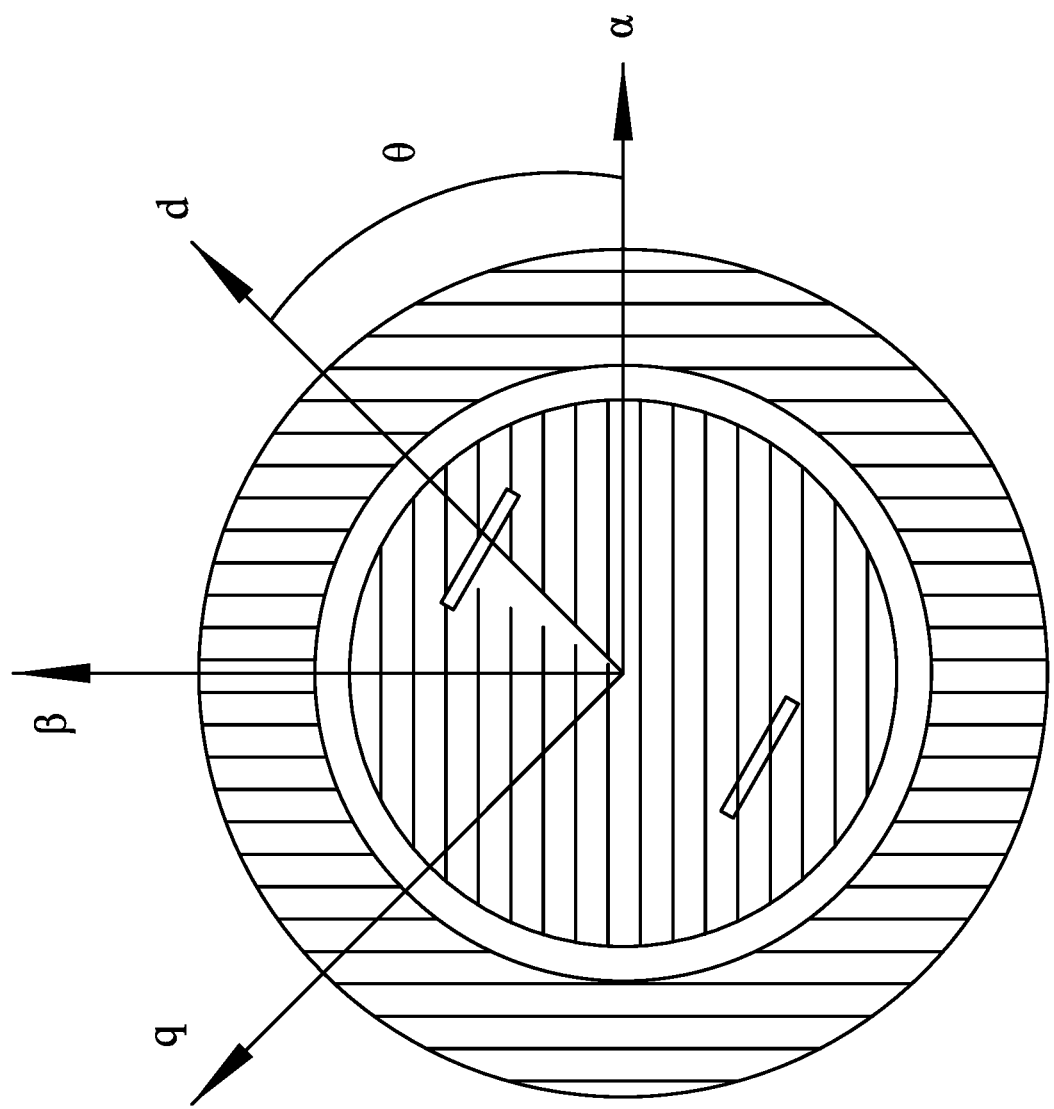
FIG. 6 is a diagram showing a coordinate system relationship for vector control of a permanent-magnet synchronous motor according to Example 1 of the disclosure.

As shown in FIG. 5, a basic working principle of a permanent-magnet synchronous motor based on sensorless vector control is briefly described (detailed descriptions can be found in textbooks). The permanent-magnet synchronous motor operates based on the interaction between the rotating magnetic field of the stator and the rotating magnetic field of the rotor. FIG. 5 illustrates two coordinate systems: a dq-coordinate system representing the rotating coordinate system of the rotor, and a stationary coordinate system ABC of the stator. The stationary coordinate system ABC can be transformed into the αβ-coordinate system, which consists of two coordinate axes, the α-axis and the β-axis. The α-axis and the β-axis are perpendicular to each other, as illustrated in FIG. 6. The rotor can be understood as rotating at speed wr as the result of the excitation current if, while the stator can be understood as rotating at speed ws due to the excitation current is. As shown in FIG. 5, the composite vector of the stator is denoted by S. The electromagnetic torque is calculated using the formula:

$$T = K \times iq$$

where, T is the electromagnetic torque, K is the coefficient, and iq is the q-axis current component of the composite vector S.

As shown in FIG. 6, the stationary coordinate system ABC is replaced by the αβ-coordinate system. The αβ-coordinate system represents the stationary coordinate system of the stator, and the dq-coordinate system represents the rotating coordinate system of the rotor. An angle between the αβ-coordinate system and the dq-coordinate system is denoted as θ.

Figure 7:
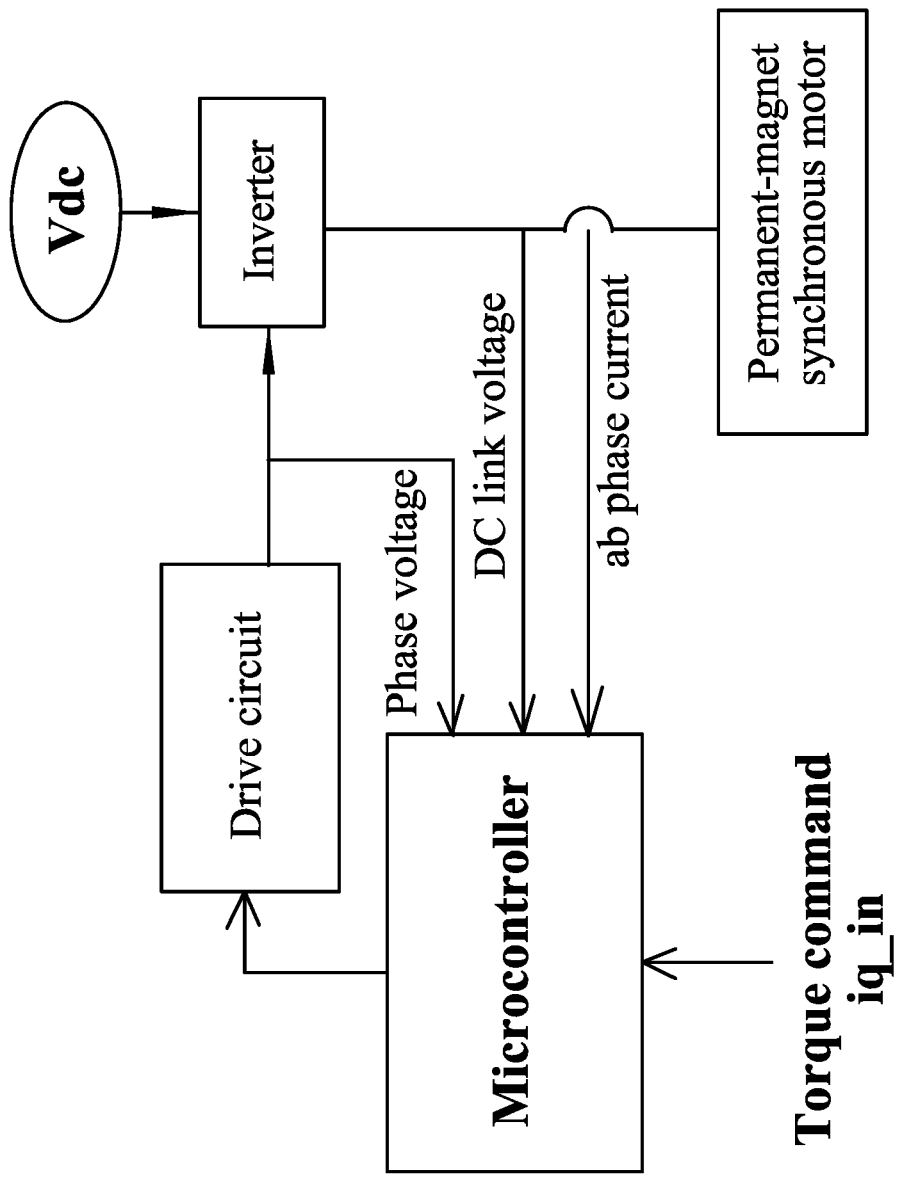
FIG. 7 is a block diagram illustrating a principle of a motor controller according to Example 1 of the disclosure.
Figure 8:
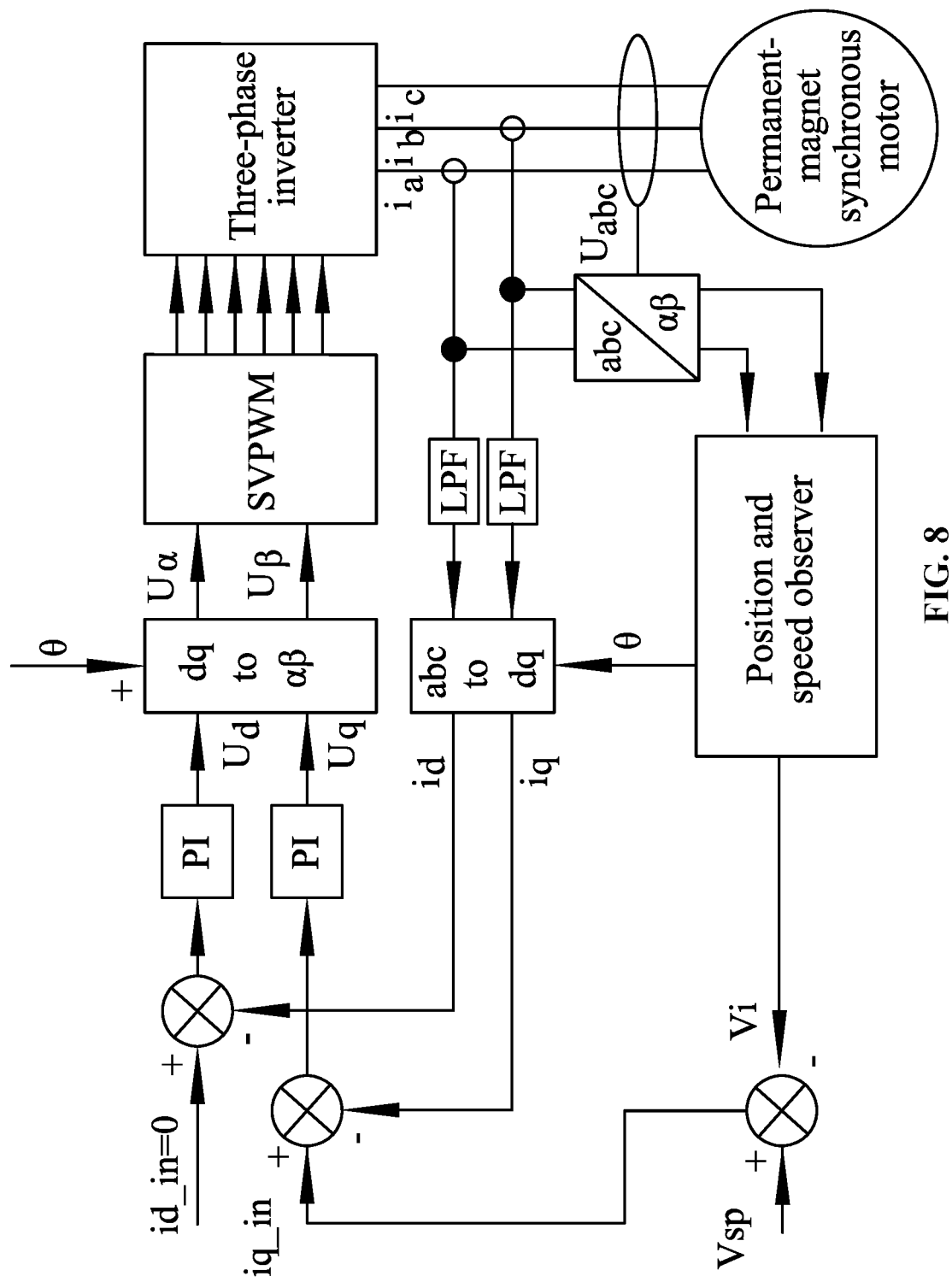
FIG. 8 is a flowchart illustrating a control process of a permanent-magnet synchronous motor according to Example 1 of the disclosure.

FIG. 7 is a block diagram illustrating the hardware control of the permanent-magnet synchronous motor. FIG. 8 is a block diagram illustrating the software control of the permanent-magnet synchronous motor based on sensorless vector control. The MCU calculates the q-axis current iq and d-axis current id based on the phase currents ia, ib, and ic. The real-time speed Vi of the motor is estimated using a position and speed observer. Assuming that a desired speed Vsp is selected through the acquired tap position input signal, the MCU controls the motor to operate at the desired speed (Vsp). When the real-time speed Vi of the motor does not reach the selected speed Vsp, the torque iq_in is adjusted until the real-time speed Vi aligns with the selected speed Vsp.

Figure 9:
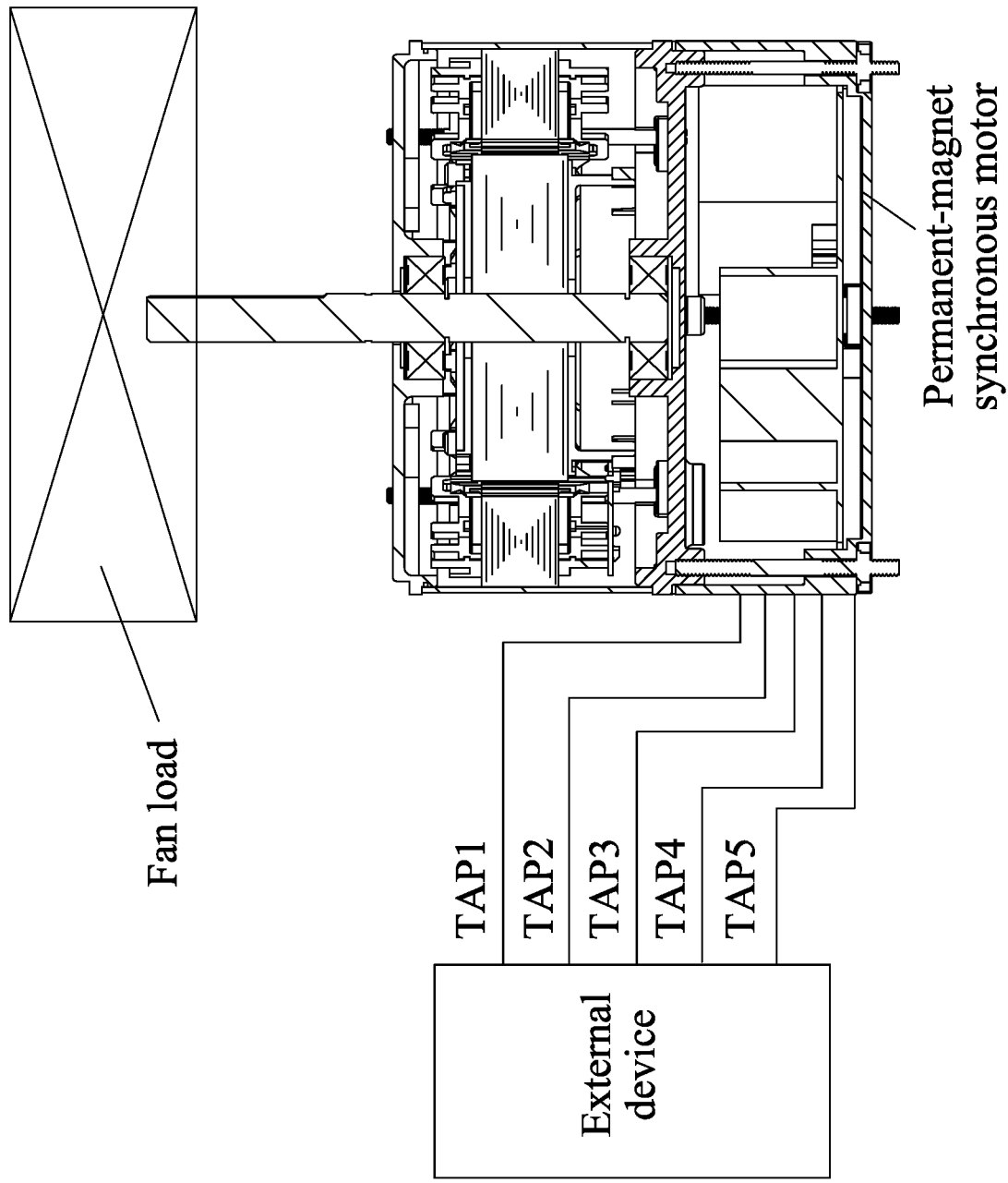
FIG. 9 is a schematic diagram illustrating the connection between the permanent-magnet synchronous motor and an external device according to Example 1 of the disclosure.
Figure 10:
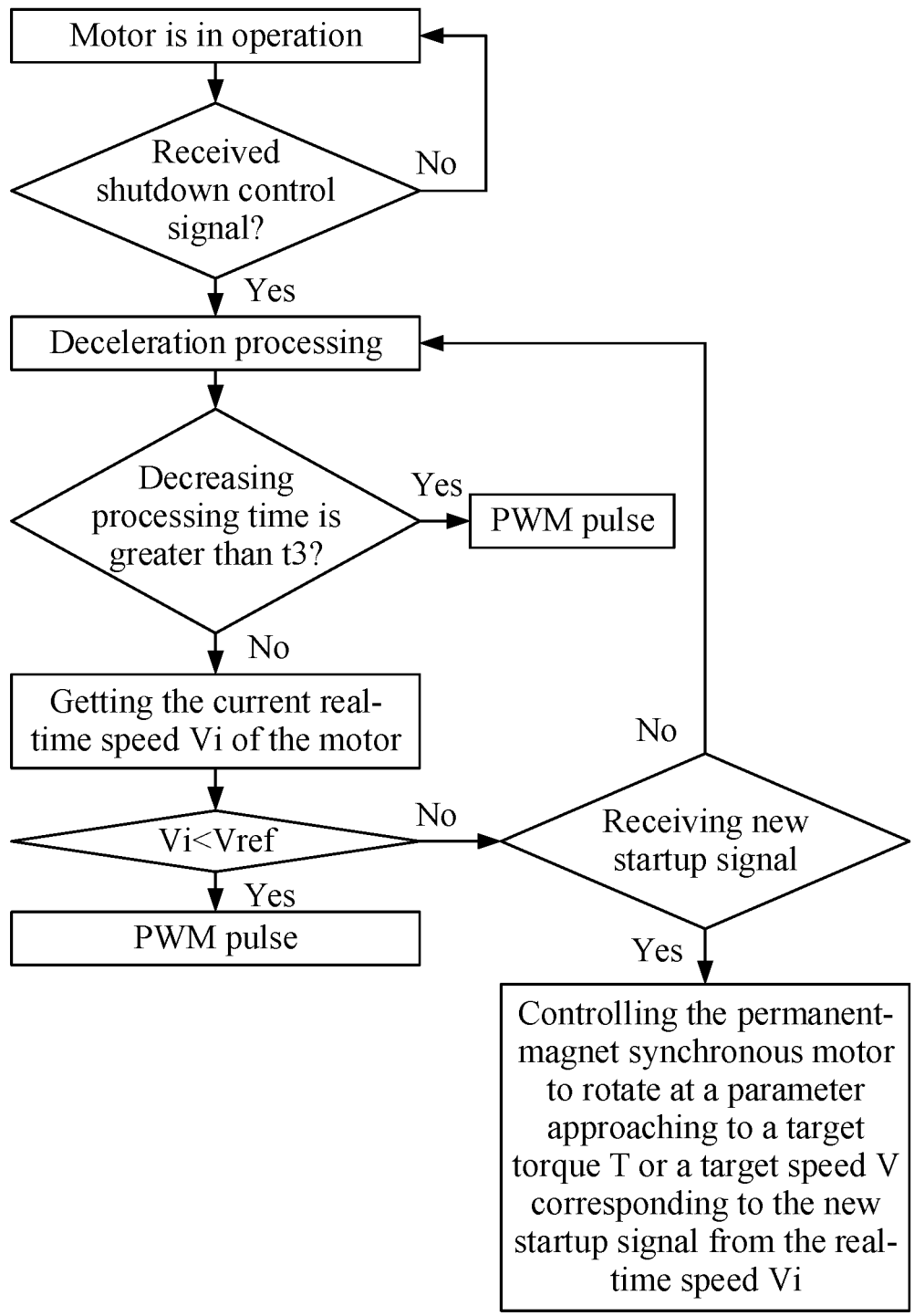
FIG. 10 is a flowchart illustrating a control method for controlling operation of a permanent-magnet synchronous motor based on sensorless vector control according to Example 1 of the disclosure.
Figure 11:
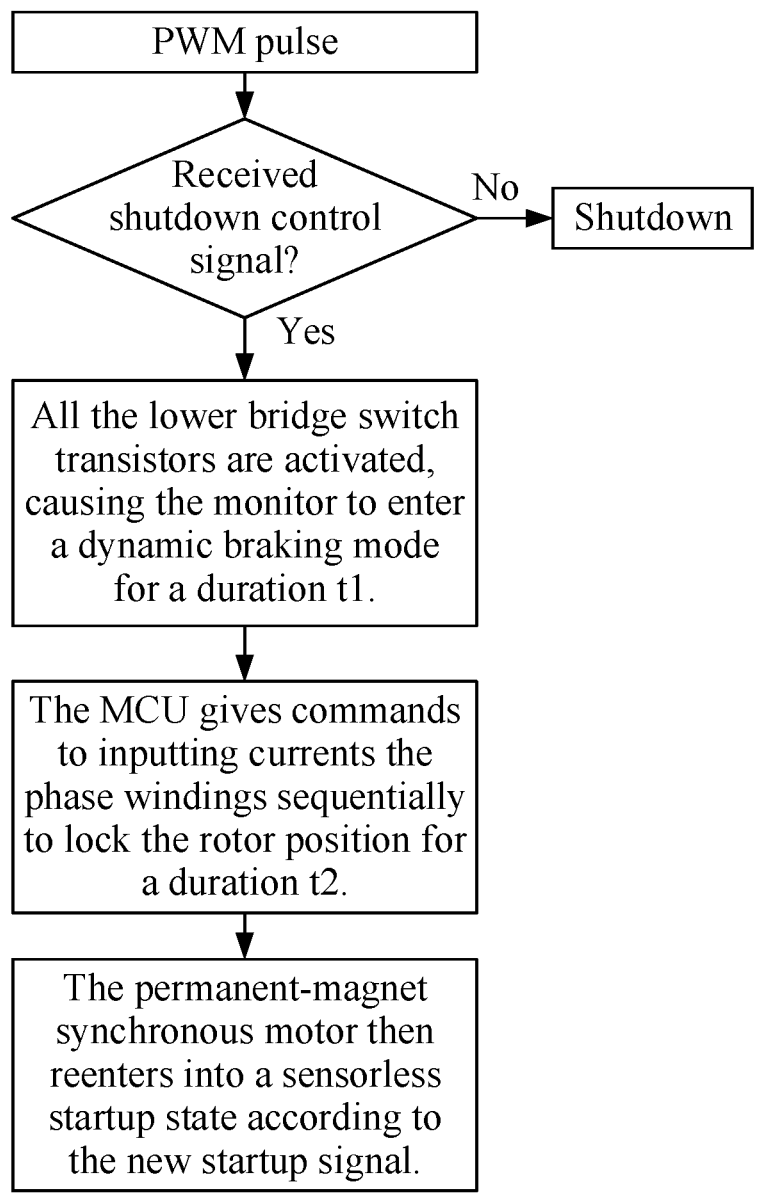
FIG. 11 is a flowchart illustrating a control process of reacquiring a new startup signal during PWM pulse blocking process according to Example 1 of the disclosure.

As shown in FIGS. 9, 10, and 11, a method for controlling operation of a permanent-magnet synchronous motor through sensorless vector control comprises the steps: the permanent-magnet synchronous motor receives a shutdown signal from an external device during operation; instead of directly blocking a PWM pulse to the inverter, MCU continues to generate a deceleration pulse to an inverter and constantly monitors a control signal sent by the external device; during the deceleration process, when the real-time speed Vi of the motor is greater than or equal to the reference speed Vref, and the MCU receives a new startup signal, the permanent-magnet synchronous motor is controlled to rotate at a parameter approaching to a target torque T or a target speed V corresponding to the new startup signal; when the real-time speed Vi of the permanent-magnet synchronous motor is lower than the reference speed Vref, the MCU blocks the PWM pulses.

When the MCU blocks the PWM pulses, the permanent-magnet synchronous motor continues rotating due to inertia, and the control signal from outside is constantly monitored. If, at this stage, the MCU receives a new startup signal, all the lower bridge switch transistors are activated, causing the monitor to enter a dynamic braking mode for a duration t1. Subsequently, the MCU gives commands to input currents to the phase windings sequentially to lock the rotor position for a duration t2. The permanent-magnet synchronous motor then reenters into a sensorless startup state according to the new startup signal.

The permanent-magnet synchronous motor is a three-phase permanent-magnet synchronous motor with a three-phase winding comprising three sets of coils U, V, W. During the PWM pulse blocking process, when the MCU receives a new startup signal, the three lower bridge switch transistors Q4, Q5, and Q6 are activated, causing the motor to enter the dynamic braking mode for a duration t1 (e.g., 1 second). Subsequently, the MCU gives commands to input currents to the three sets of coils U, V, and W sequentially to lock the rotor position for a duration t2 (e.g., 2 seconds).

When the motor receives a shutdown signal from outside, the MCU controls the motor to decelerate. When the shutdown signal exceeds or equals a set time duration t3 (e.g., 3 seconds), the MCU forcefully blocks the PWM pulses.

The reference speed Vref is in the range of 200 to 400 rpm. Specifically, the reference speed Vref is 300 rpm.

When all tap position signals are removed (i.e., all the switches K1, K2 . . . Kn are open, and all the tap position input signals Tap1, Tap2 . . . Tapn are disconnected from the MCU), the MCU continues to output pulses to the inverter for deceleration. When the real-time speed Vi is less than the reference speed Vref (e.g., Vref=300 rpm), the MCU blocks the PWM pulses, effectively bringing the motor to a stop at low speeds. The method exhibits fast response and adaptability to large inertia loads, ensuring a high-quality user experience. Despite the significant load inertia, a torque at speeds of 300 rpm and below is sufficient to stop the inertia loads without causing any abnormalities such as shaking or noise. At this stage, the startup process shares the same logic as a normal stationary startup, guaranteeing a smooth startup. During the PWM pulse blocking process, even if a new tap position signal is received (i.e., when one of the switches K1, K2 . . . Kn is closed, and one of the tap position input signals Tap1, Tap2 . . . Tapn is provided as input to the MCU, effectively providing the MCU a new startup signal), the new tap position signal is not processed until the motor completely stops running. Subsequently, the motor is restarted based on the new tap position signal. However, during the deceleration process, if the real-time speed Vi reaches or exceeds the set speed Vref, and the MCU acquires a new tap position signal, the motor gradually operates from the real-time speed Vi to the target speed V corresponding to the new tap position signal. This method eliminates the need for the traditional motor tap position switching method for pre-positioning during high-speed rotation, thus avoiding issues such as shaking, jerking, and noise, and reducing current impact. The switches are effectively protected and the service life of the permanent-magnet synchronous motor is prolonged. In applications with high-inertia loads, the method allows the permanent-magnet synchronous motor to respond promptly and smoothly during tap position signal recovery, frequent start-stop cycles, and tap position switching, thereby preventing issues such as shaking, jerking, and noise.

By incrementally adjusting the real-time speed Vi with a step size V0 towards the target speed V, the real-time speed Vi is adjusted to approach the target speed V corresponding to the new tap position signal. Specifically, when the real-time speed Vi is greater than the target speed V corresponding to the new tap position signal, the motor decelerates with a step size V0 towards the speed V. Conversely, when the real-time speed Vi is lower than the target speed V, the motor accelerates with a step size V0 to approach the target speed V. The five tap position input signals in Table 1 can be interpreted as new startup signals.

TABLE 1

Tap position input signals and corresponding motor speeds

| Tap position input signals | Speed (rpm) |
| --- | --- |
| 1st tap position input signal Tap1 | 600 |
| 2nd tap position input signal Tap2 | 750 |
| 3rd tap position input signal Tap3 | 900 |
| 4th tap position input signal Tap4 | 1000 |
| 5th tap position input signal Tap5 | 1150 |

For example, assuming that the permanent-magnet synchronous motor comprises five tap positions: Tap1, Tap2, Tap3, Tap4, and Tap5. The corresponding speed for each tap position is shown in Table 1. The MCU is connected to five tap position detection circuits, as shown in FIG. 4. The MCU continuously checks the tap position input signals from the five tap position detection circuits. When the motor is running in $3^{rd}$ tap position, the corresponding motor speed for the $3^{rd}$ tap position input signal Tap3 is 900 rpm. When the $3^{rd}$ tap position input signal Tap3 is removed, the motor speed gradually decreases from 900 rpm to 300 rpm. During the deceleration process, if the MCU doesn't receive the corresponding tap position input signal, the motor speed continues to decrease until it reaches 300 rpm. At this point, the MCU blocks PWM pulses, causing the motor to stop directly. However, if the MCU receives a new tap position signal during the PWM pulse blocking process, even with a significant inertia load, the torque at speeds of 300 rpm and below is sufficient to bring the load to a stop without any issues such as shaking or noise. In such cases, the startup process shares the same logic as the normal stationary startup, ensuring a smooth startup.

If the MCU regains the 1st tap position input signal Tap1 after the motor has stopped, the motor restarts using the predetermined positioning method. Upon restarting, the motor speed gradually increases and stabilizes at 600 rpm.

When the motor is running in 3rd tap position, the corresponding speed for the tap position input signal Tap3 is 900 rpm. When the $3^{rd}$ tap position input signal Tap3 is removed, the motor speed gradually decreases from 900 rpm to 300 rpm. Assuming that when the motor speed drops to 800 rpm, the $1^{st}$ tap position input signal Tap1 is received. Since the $1^{st}$ tap position input signal Tap1 corresponds to a motor speed of 600 rpm, which is lower than the current speed of 800 rpm, the motor continues to decelerate until the speed reaches a stable speed of 600 rpm.

When the motor is running in 3rd tap position, the corresponding speed for the tap position input signal Tap3 is 900 rpm. When the $3^{rd}$ tap position input signal Tap3 is removed, the motor speed gradually decreases from 900 rpm to 300 rpm. Assuming that when the motor speed drops to 800 rpm, the $5^{th}$ tap position input signal Tap5 is received. Since the $5^{th}$ tap position input signal Tap5 corresponds to a motor speed of 1150 rpm, which is higher than the current speed of 800 rpm, the motor accelerates until the speed reaches a stable speed of 1150 rpm.

By employing the method, during the deceleration of the permanent-magnet synchronous motor, if the tap position signal is restored, the MCU adjusts the motor speed accordingly. The method enables the permanent-magnet synchronous motor to quickly respond and smoothly restart in situations such as signal recovery, frequent start-stop cycles, and tap position switching. It prevents issues such as shaking, jerking, and noise, reduces current impact, effectively protects switches, extends the lifespan of the permanent-magnet synchronous motor, and improves the user experience.

The step size V0 is determined based on the rotational inertia and the difference between the real-time speed Vi and the target speed V corresponding to the acquired tap position signal. Specifically, V0=K*(Vi-V)/G, where K is a coefficient that can be obtained through experimentally, Vi is the real-time speed, V is the target speed corresponding to the acquired tap position signal, and G is the rotational inertia of the motor. The coefficient K is determined experimentally, and the value of the step size V0 is determined based on the actual values of the rotational inertia G, the real-time speed Vi, and the target speed V. Therefore, the step size V0 is automatically adjusted to an appropriate value, allowing the permanent-magnet synchronous motor to match the adjusted step size V0 for acceleration or deceleration. Consequently, the motor can rapidly respond and smoothly restart in scenarios such as signal recovery, frequent start-stop cycles, and tap position switching, effectively enhancing the success rate of the restarting the permanent-magnet synchronous motor.

Assuming a step size V0 of 10 revolutions per second, the motor incrementally increases or decreases its real-time speed Vi by 10 revolutions per second, to achieve acceleration or deceleration towards the target speed V.

When all tap position signals are removed, the MCU continues to output pulses to the inverter for deceleration. Specifically, for the deceleration, the step size V10 is determined based on the difference between the real-time speed Vi and the reference speed Vref. The step size is calculated as V10=(Vi-Vref)/T, where T is a predetermined time.

The deceleration process comprises gradually reducing the motor speed from the real-time speed Vi to the reference speed Vref using the step size V0. The process continues until the real-time speed Vi falls below the reference speed Vref. At this point, the MCU blocks the PWM pulses. In this example, the reference speed Vref is determined through experimentally, while the real-time peed Vi is measured by a velocity observer.

Example 2

Figure 12:
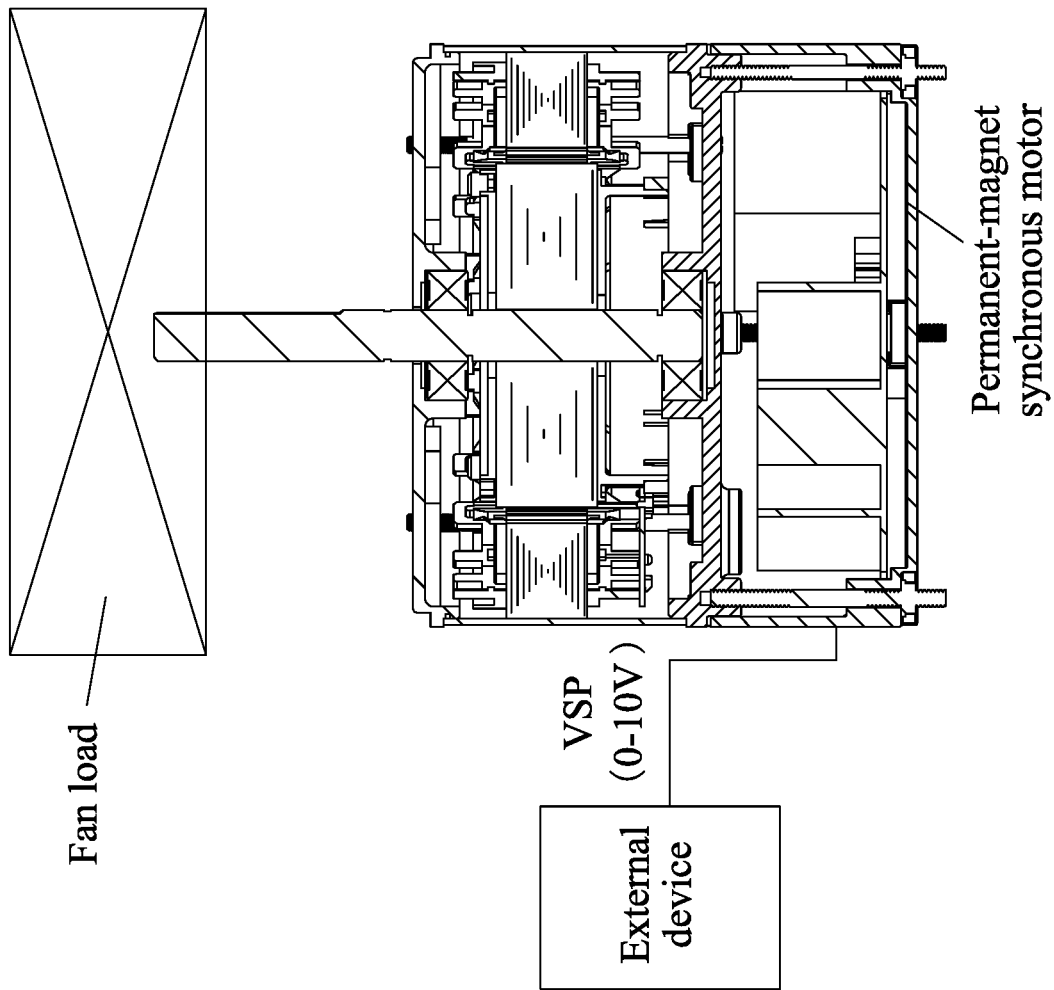
FIG. 12 is a schematic diagram illustrating the connection between the permanent-magnet synchronous motor and an external device pulse according to Example 2 of the disclosure.
Figure 13:
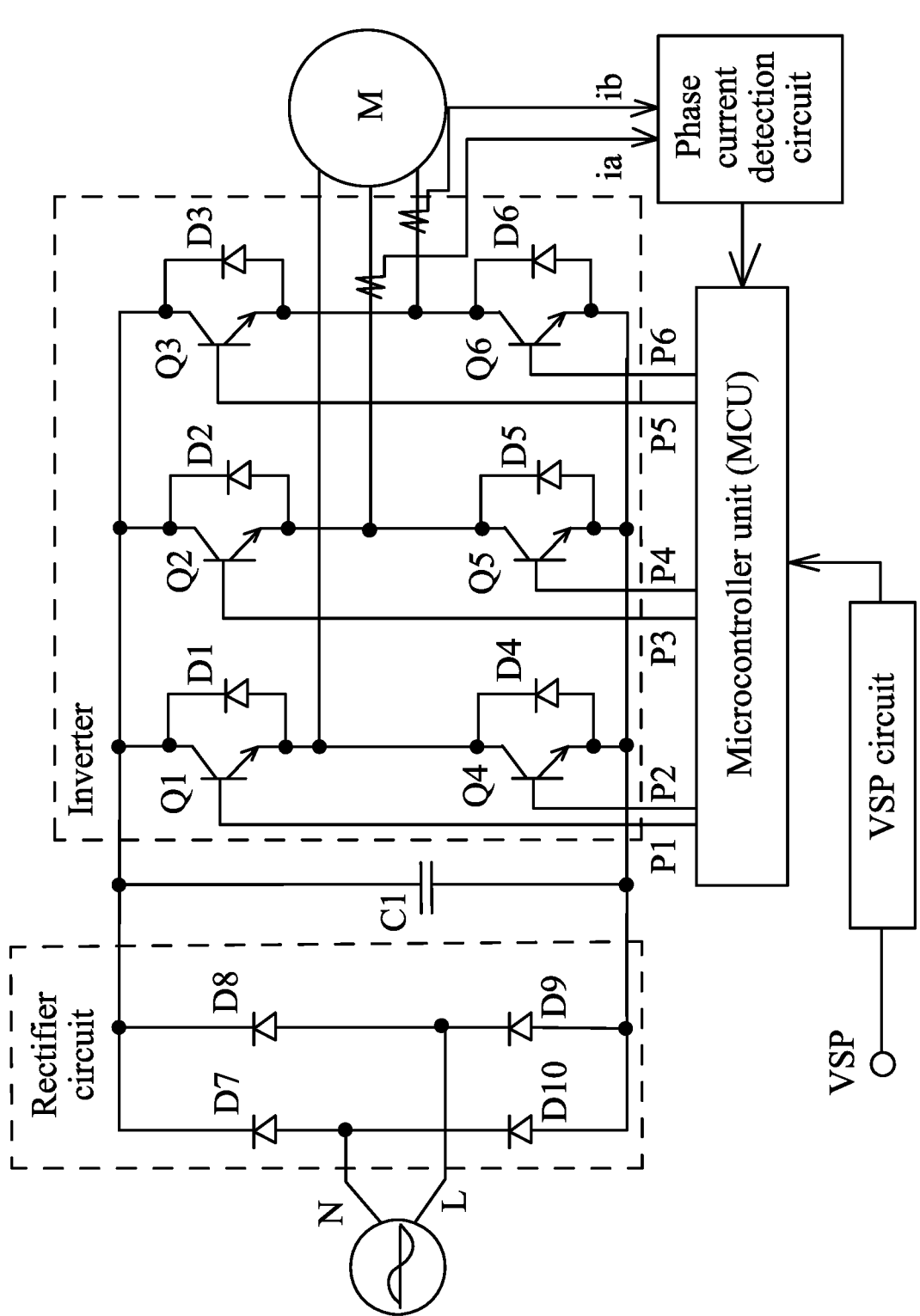
FIG. 13 is a circuit block diagram of a motor controller according to Example 2 of the disclosure.

The example presents an improvement upon Example 1, focusing on the utilization of a Variable Speed Potentiometer (VSP) circuit as a replacement for the plurality of tap position detection circuits and optocouplers. As shown in FIGS. 12 and 13, an external device emits a VSP signal to the permanent-magnet synchronous motor based on the sensorless vector control. The VSP signal ranges from 0 to 10 VDC, and the types of the VSP signal are described in Table 2. When the VSP signal reaches 0 V, it functions as a shutdown signal. During motor operation, when the permanent-magnet synchronous motor receives the shutdown signal from outside, the MCU does not immediately block the PWM pulses to the inverter. Instead, the MCU continues to output pulses to the inverter for deceleration while constantly monitoring the control signals received from outside. During the deceleration process, when the real-time speed Vi is greater than or equal to the reference speed Vref, and the MCU receives a new startup signal, the motor runs approach the target torque T or the target speed V corresponding to the new startup signal. However, when the real-time speed Vi falls below the reference speed Vref, the MCU locks the PWM pulses. Various types of new startup signals are provided, including a 0.5 V-2 V signal, a 2 V-4 V signal, a 4 V-6 V signal, a 6 V-8 V signal, and an 8 V-10 V signal.

TABLE 2

Various types of new startup signals

| 0-10 VDC VSP signal(Voltage signal) | Speed (rpm) | Signal type |
|---|---|---|
| 0 V | 0 | Shutdown signal |
| 0.5 V-2 V | 600 | Startup Signal |
| 2 V-4 V | 750 | Startup Signal |
| 4 V-6 V | 900 | Startup Signal |
| 6 V-8 V | 1000 | Startup Signal |
| 8 V-10 V | 1150 | Startup Signal |

Similarly, a VSP circuit is utilized to select the operating torque of the motor, as shown in Table 3. For example, when the VSP signal is 0 V, it functions as a shutdown signal. During motor operation, when the motor receives a shutdown signal from outside, the MCU does not immediately block the PWM pulses to the inverter. Instead, the MCU continues to output pulses to the inverter for deceleration while constantly monitoring the control signals received from outside. During the deceleration process, if the motor's real-time running speed Vi is greater than or equal to the reference speed Vref, and the microcontroller MCU reacquires a new startup signal, the motor operates to approach the target torque T corresponding to the newly acquired startup signal. However, when the real-time speed Vi is lower than the reference speed Vref, the MCU blocks the PWM pulses. Various types of new startup signals are provided for torque selection. For example, the 0.5 V-2 V signal corresponds to a torque of 20 Nm, the 2 V-4 V signal corresponds to a torque of 40 Nm, the 4 V-6 V signal corresponds to a torque of 60 Nm, the 6 V-8 V signal corresponds to a torque of 80 Nm, and the 8 V-10 V signal corresponds to a torque of 100 Nm.

When the VSP signal is a startup signal in the range of 2 V-4 V, the motor operates with a torque of 40 Nm. While the motor is running, if the VSP signal reaches 0 V, it functions as a shutdown signal. Instead of directly blocking the PWM pulses to the inverter, the MCU continues to output pulses to the inverter for deceleration. During the deceleration process, when the real-time speed Vi is greater than or equal to the reference speed Vref, and the MCU receives a new startup signal (for example, a new startup signal VSP in the range of 4 V-6 V), the motor operates with a torque of 60 Nm. Further details regarding other control aspects are not provided here.

TABLE 3

Various types of new startup signals

| 0-10 VDC VSP signal(Voltage signal) | Torque (N/m)) | Signal type |
|---|---|---|
| 0 V | 0 | Shutdown signal |
| 0.5 V-2 V | 20 | Startup Signal |
| 2 V-4 V | 40 | Startup Signal |
| 4 V-6 V | 60 | Startup Signal |
| 6 V-8 V | 80 | Startup Signal |
| 8 V-10 V | 100 | Startup Signal |

Furthermore, when an external device controls the sensorless vector-controlled permanent-magnet synchronous motor using PWM signals, the principle is similar to that of the VSP signal, as shown in Table 4. A detailed description is not provided here.

TABLE 4

Various types of new startup signals

| PWM signal | Torque (N/m) | Signal type |
|---|---|---|
| 0 V | 0 | Shutdown signal |
| 10 pulses | 20 | Startup Signal |
| 20 pulses | 40 | Startup Signal |
| 30 pulses | 60 | Startup Signal |
| 40 pulses | 80 | Startup Signal |
| 50 pulses | 100 | Startup Signal |

It will be obvious to those skilled in the art that changes and modifications may be made, and therefore, the aim in the appended claims is to cover all such changes and modifications.

What is claimed is:

1. A method for controlling operation of a permanent-magnet synchronous motor through sensorless vector control, the method comprising:
   during operation of the permanent-magnet synchronous motor, receiving, by the permanent-magnet synchronous motor, a shutdown signal from an external device;
   uninterruptedly outputting, by a microcontroller unit (MCU), a deceleration pulse to an inverter, instead of directly blocking a PWM pulse to the inverter, and constantly monitoring a control signal sent by the external device;
   during a deceleration process, when the MCU receives a new startup signal and a real-time speed Vi of the permanent-magnet synchronous motor is greater than or equal to a reference speed Vref, controlling the permanent-magnet synchronous motor to rotate at a parameter approaching to a target torque T or a target speed V corresponding to the new startup signal from the real-time speed Vi;
   blocking, by the MCU, the PWM pulse when the real-time speed Vi of the permanent-magnet synchronous motor is lower than the reference speed Vref;
   wherein when the MCU blocks the PWM pulse, the permanent-magnet synchronous motor continues rotating due to inertia, and the control signal sent by the external device is constantly monitored; if, at this stage, the MCU receives another new startup signal, all lower bridge switch transistors are activated, causing the permanent-magnet synchronous motor to enter a dynamic braking mode for a duration t1; the MCU gives commands to input currents to the phase windings sequentially to lock a rotor position for a duration t2; and the permanent-magnet synchronous motor reenters into a sensorless startup state according to the new startup signal; and wherein the permanent-magnet synchronous motor is a three-phase permanent-magnet synchronous motor with a three-phase winding comprising three sets of coils U, V, W; when the MCU blocks the PWM pulse and the MCU receives the new startup signal, three lower bridge switch transistors Q4, Q5, and Q6 are activated, causing the permanent-magnet synchronous motor to enter the dynamic braking mode for the duration t1; and the MCU gives commands to input currents to the three sets of coils U, V, and W sequentially to lock the rotor position for the duration t2.

2. The method of claim 1, wherein when the motor receives the shutdown signal from the external device, the MCU controls the motor to decelerate; when the shutdown signal exceeds or equals a set time duration t3, the MCU blocks the PWM pulses.

3. The method of claim 1, wherein the reference speed Vref is in the range of 200 to 400 rpm.

4. The method of claim 1, wherein the permanent-magnet synchronous motor rotates at the parameter approaching to the target speed V corresponding to the new startup signal from the real-time speed Vi with a step size V0 increasingly or decreasingly.

5. The method of claim 4, wherein the step size V0 is determined based on the rotational inertia and a difference between the real-time speed Vi and the target speed V corresponding to an acquired tap position signal.

* * * * *